United States Patent Office 2,980,139
Patented Apr. 18, 1961

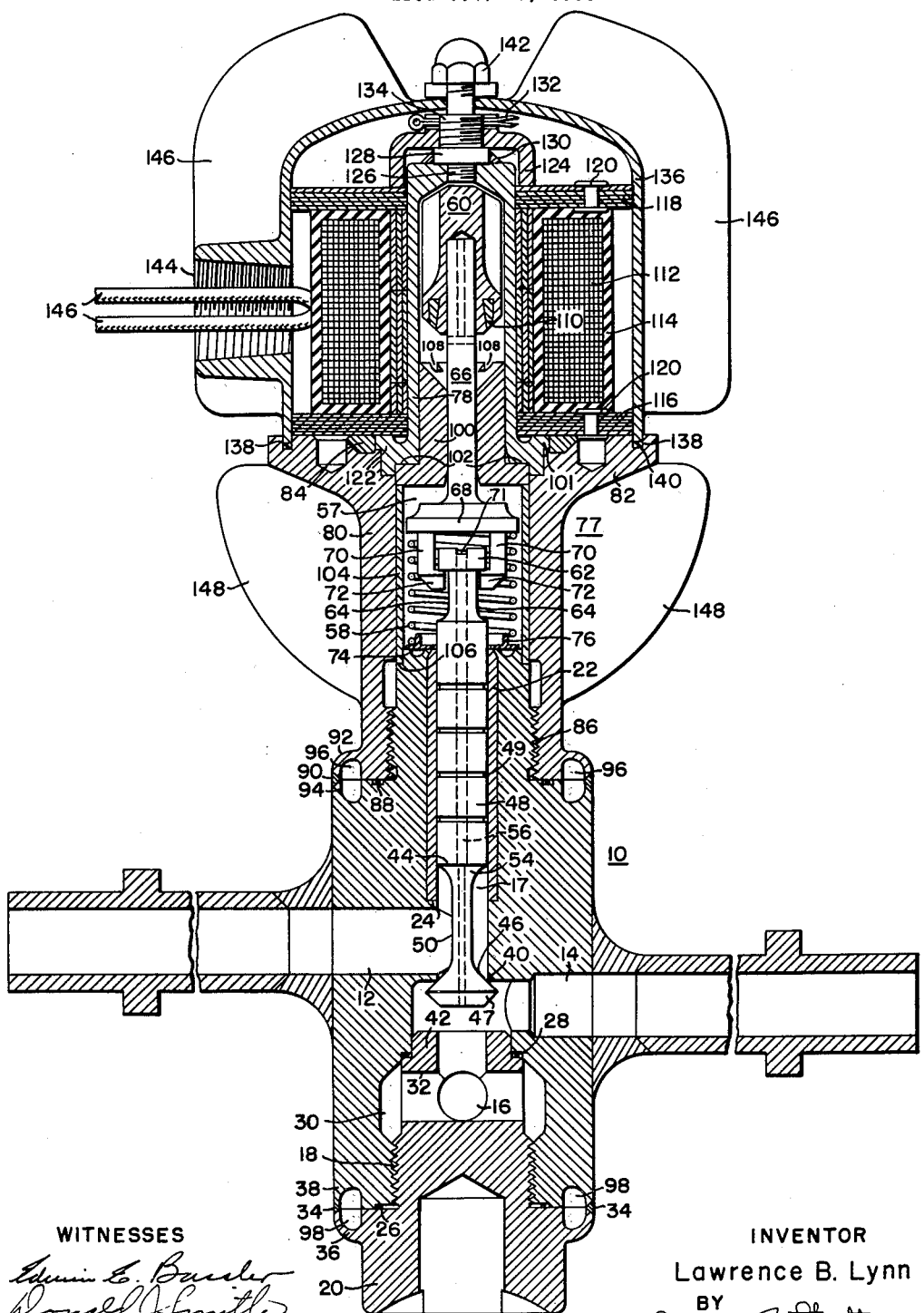

2,980,139

TWO-WAY VALVE

Lawrence B. Lynn, Wilkinsburg, Pa., assignor to Westinghouse Electric Corporation, East Pittsburgh, Pa., a corporation of Pennsylvania Filed Oct. 10, 1956, Ser. No. 615,065

7 Claims. (Cl. 137—625.5)

This invention pertains to valves and more particularly, but not necessarily, to a hermetically sealed, dual-outlet valve which is actuated by a solenoid.

In previous designs of dual-outlet valves, it has been difficult, if not impossible, to make a valve of the character described which would permit no external leakage. When such two-way valves are used in systems handling hazardous fluids, particularly in those systems operated at high pressures and elevated temperatures, it is desirable to prevent all external leakage and thereby to increase greatly the safety of the system. Furthermore, previous designs of these valves have had no adequate means for damping movement of the valve mechanism to prevent the application of shock pressures to the system. Moreover, when prior valves are provided with a lost-motion connection between the valve stem and the armature of the solenoid in order to overcome the valve friction by means of the initial impact of the lost-motion connection, these valves have been relatively noisy in operation and undue wear occurs on the valve seats, as a result of the absence of adequate damping means. Such wear of the valve parts is particularly undesirable in those applications wherein the valve components are hermetically sealed, for maintenance is then comparatively difficult to accomplish.

Prior valves of this nature have suffered from the further disadvantage that the fluid pressures exerted upon internal areas of the valve are not statically balanced. As a result, operation of these valves frequently has been difficult and the valves have been subjected to undue wearing stresses. Because of the structural arrangement of prior solenoid-operated valves it has been difficult to effectively dissipate heat generated by the solenoid and associated parts.

Accordingly, an object of the present invention is to improve the operational and sealing characteristics of a valve adapted for use in hermetically sealed systems.

More specifically, it is an object of the invention to provide a hermetically sealed valve, the component parts of which can be severed relatively easily for the necessary repair and maintenance of the valve.

Another object of the invention is to furnish a valve of the character described with adequate damping means for preventing the application of shock pressures to parts of the system wherein the valve is utilized. Such damping mechanism is essential in those systems where fluid pressures of considerable magnitude are developed.

A further object of the invention is to so arrange the operating mechanism of a valve that forces tending to bind together the engaging surfaces of the valve are easily overcome, even after prolonged periods of using the valve in a sole operational position thereof, when it is desired to actuate the valve to another position.

Still another object of the invention is to minimize wear of the valve components and to facilitate the manipulation thereof, by equalizing the static fluid pressures exerted upon internal areas of the valve.

A still further object of the invention is to provide an efficient dual-outlet valve of the character described and, more specifically to provide a dual-outlet valve having means associated therewith, capable of being rendered operative to permit egress of fluid from a preselectable one of said outlets in response to an external condition.

Yet another object of the invention is to effect a facile and efficient control of the operating mechanism of a hermetically sealed valve through the employment of an electrical solenoid.

Other objects of the invention are to provide a valve adapted for use in systems employing corrosive or hazardous fluids, particularly at elevated temperatures and pressures, and more specifically to arrange the structural configuration and operational linkages of a solenoid-operated valve such that the solenoid and parts of said linkage are spatially removed from those areas contacted by hot fluids passing through the valve and are disposed so that radiant heat dissipation therefrom is practicable; and to proved means for effecting said heat dissipation.

A still further object of the invention is the application of motion-damping means to the valve mechanism of a solenoid-operated valve, while suspending application of the aforesaid means to the solenoid armature during the initial movement thereof.

Referring now to the drawing, there is shown therein a dual-outlet valve which is actuated by the armature of a solenoid connected to the upper end of a valve stem. This valve is designed to operate in fluid systems having relatively high pressures and elevated temperatures. Valve body 10 is a hermetically sealed unit so that all external leakage from the valve is prevented. The valve body 10 and other components of the valve contacting the fluid of the system desirably are formed from a corrosion-resistant material, such as stainless steel. The valve body 10 has a generally cylindrical shape and is provided with a radially extending outlet opening 12, a radial inlet opening 14 on the opposite side slightly below the outlet opening 12, and a radial exhaust or second outlet opening 16 which is placed below the inlet opening 14 and at right angles to both the inlet and the outlet openings. The valve body 10 is also provided with a central longitudinal opening 17 so that the various surfaces of the valve body may be easily machined, and with which the inlet, outlet and exhaust openings communicate. This longitudinal opening terminates at the bottom in a relatively larger threaded portion 18, which is closed by bottom plug 20 threaded into the opening 18. The longitudinal opening 17 is lined with a valve guide bushing 22 at the upper end thereof which bushing seats on an inwardly projecting shoulder 24 at its lower end, and is secured in place in any desired manner, such as by a press fit. The bottom plug 20 is sealed to the valve body 10 by means of two O-rings 26 and 28. An annular passage 30 is formed in the valve body 10 adjacent the upper end of the bottom plug 20 so that the fluid may be discharged through a passage 32 in the bottom plug 20 and out the exhaust opening 16. The leak tightness of the joint between the bottom plug 20 and the valve body 10 is ensured by means of an annular sealing weld or other sealing element 34 which joins two converging flanges 36 and 38 formed on the bottom plug 20 and the valve body 10, respectively.

The valve body is provided with two circular seats 40 and 42. The seat 40 is formed in the valve body 10, while the circular seat 42 is formed on the upper surface of the bottom plug 20.

Valve mechanism 44 is mounted in the upper portion of the longitudinal opening 17 in the valve body 10 and has two opposed seats 46 and 47 formed adjacent its lower end. The upper portion of the valve mechanism 44 is provided with a valve stem or piston 48 which closely fits the inner diameter of the guide bushing 22 secured in the longitudinal opening 17 of the valve body 10. The valve stem 48 is provided with four annular grooves 49 in order to provide "weep" spaces or relief areas for the fluid which leaks pass the valve stem. The lower portion of the valve stem is reduced in diameter or necked down at 50 to facilitate flow of fluid through the valve and terminates in an enlarged head on which the opposed seats 46 and 47 are formed. The valve mechanism 44, including its valve stem 48 is preferably formed of a relatively hard corrosion-resistant material such as stainless steel, and the guide bushing 22 should be formed similarly in order to prevent wear of these parts when the valve is operated in a fluid such as water which has very poor lubricating properties.

The valve mechanism 44 is provided with a small, centrally and longitudinally extending passage 56 which extends completely therethrough and allows the fluid in the system to fill the upper portion of the valve in order to balance the valve mechanism under static conditions. The valve will be statically balanced inasmuch as the inlet or exhaust pressure will act on the top and bottom surfaces of the valve mechanism in its upward or downward positions, respectively, as shown in the drawing, while at either position any other pressure will act on opposed surfaces of the necked down portion 50 which surfaces are of equal area. In addition to balancing the valve so that it may be easily moved, the passage 56 also provides damping during the valve movement in order to prevent the application of shock pressures to the system in which the valve is utilized. As described above, the valve stem 48 is a close fit in the guide bushing 22 so that substantially all of the flow through the system between the lower portion of the valve body and the upper portion of the valve body must take place through the passage 56. Since the fluid within the chamber 57 adjacent the upper extremity of the valve stem 48 is static, while the valve is maintained in one position thereof, comparatively little heat will be transferred thereby to the solenoid. In furtherance of this purpose, the valve stem 48 is lengthened in order to minimize undesirable heat transfer therethrough and to spatially remove the solenoid windings as far as practical from those parts of the valve intended to contact high temperature fluids. The elongation of the valve stem 48 additionally serves to increase the effectiveness of the seal between the guide bushing 22 and the valve stem.

As will be described later, when the valve mechanism 44 is moved by the solenoid, a part of the fluid in the static fluid chamber 57 is displaced and must flow to the lower portion of the valve body via the passage 56. By proper choice of dimensions for the passage 56, and the proper design of spring 58, any degree of damping can be achieved since the size of passage 56 will control the flow rate which in turn will determine the amount of damping. As will be explained below, this valve is provided with a lost-motion connection between the valve stem 48 and solenoid armature 60 in order to permit development of considerable momentum in the solenoid armature before the latter contacts head 62 of the valve stem 48. The use of a lost-motion connection necessitates the provision of damping means in order to prevent the development of too high armature momenta when the valve is to be manipulated. If no damping arrangement were provided, the energies developed in the armature 60 and valve stem 48 would be sufficiently high to damage the various valve components, e.g., when the valve closes on one of the seats 40 and 42.

One form of the aforesaid lost-motion connection includes as an element thereof the circular head portion 62 formed at the upper end of the valve stem 48 by undercutting the stem, as indicated by the reference characters 64. The armature 60 of the solenoid is connected at its lower end to an armature stem 66, having a flanged portion 68 adjacent the lower end thereof, to which flange portion is secured two downwardly extending jaws 70, arranged to engage the undersurface of the head portion 62 of the valve stem 48 and thereby to connect the valve mechanism 44 to the armature 60. A groove 71 extending across the top surface of the valve stem head 62 adjoins the upper end of the passage 56 to permit egress of fluid therefrom when the flange portion 68, during energization of the solenoid, engages the aforesaid top surface. When assembling the lost-motion connection, inwardly extending portions 72 of the jaws 70 are slipped under the head portion 62 of the valve stem 48 prior to the installation of a composite casing presently to be described. The distance between the portions 72 of the jaws 70 is adequate for clearing the undercut portion 64 of the valve stem 48.

The thickness of the head portion 62 is substantially less than the distance between the lower surface of the flanged portion 68 and the upper surface of the inwardly extending portions 72 of the jaws 70 in order to impart a lost-motion characteristic to the connection. This lost motion is necessary so that the armature 60, when driven downwardly by the solenoid, will attain considerable momentum before it contacts the head portion 62 of the valve stem 48. This momentum ensures operation of the valve mechanism by the armature 60, particularly after the valve has remained in one position for a long period and considerable force is therefore necessary to unseat the valve components.

For closing the outlet opening 12, the compression spring 58 is placed between the top of the valve body 10 and the under side of the flange 68 of the armature stem 66 to urge the seat 46 of the valve mechanism 44 into sealing engagement with the circular seat 40 in the valve body 10, when the solenoid is denergized. A spring washer 74 having an upwardly extending annular projection 76 for properly positioning the spring 58 is placed between the lower end of the spring 58 and the upper surface of the valve body 10. On the other hand, energization of the solenoid operates to close the exhaust opening 16 by urging seat 47 of the valve mechanism 44 into sealing engagement with the circular seat 42 of bottom plug 20. Obviously lost-motion is attainable whether the armature stem 66 is moved downwardly under impetus of the solenoid or upwardly, upon deenergization thereof, under impetus of the spring 58.

The top portion of the valve stem 48 as well as the armature stem 66 and the armature 60 are enclosed by a composite casing 77 having a closed upper end and comprising a closed upper tubular section 78 and a lower tubular section 80 provided with a flange 82 adjacent its upper end for supporting components presently to be described. The lower section 80 and the upper section 78 are joined and sealed against leakage by means of an annular weld 84 to form the composite casing closed at its upper end. The lower end of the tubular section 80 is joined to the upper portion of the valve body 10 by means of a threaded connection 86 and is hermetically sealed thereto, in this example, by means of an O-ring 88 and an annular sealing weld 90 adjoining the contiguous flanges 92 and 94, respectively, formed on the tubular section 80 and the valve body 10. Each of the annular welds 90 and 34 are backed by an annular space 96 or 98, respectively, which are formed by the converging pairs of flanges 36 and 38, and 92 and 94, respectively. The provision of the annular spaces 96 or 98 facilitates cutting the associated weld or adjacent part in case severance of the composite casing 77, valve body 10, or bottom plug 20 becomes necessary. It is contemplated that the upper section 78 of the composite casing 77 will be fabricated from non-magnetic material in order to minimize interference thereof with the magnetic flux of the solenoid presently to be described. It is further considered, relevant to the aforedescribed components 78 and 80 of the composite casing, that they will be provided with sufficient wall thickness to withstand the pressures encountered in systems wherein the valve forming the subject of this invention can be utilized.

Positioned inside the upper casing section 78 is an armature stem guide bushing 100, the flange portion of which is held firmly between a shoulder 102 formed adjacent the lower end of the casing section 78 and a tubular spacer 104 whose lower edge rests on a shoulder 106 formed adjacent the upper end of the valve body 10. The armature stem 66 loosely fits within the guide bushing 100 in order to ensure freedom of movement for the armature 60. The guide bushing 100 is desirably fabricated from magnetic material to minimize fluxile gap and is provided with a number of longitudinally extending slots 108 disposed around its outer periphery in order that the fluid of the system can completely fill the armature cavity to balance the fluid pressures applied to all portions of the armature stem 66.

The composite casing 77 consisting of the lower tubular section 80 and the upper tubular section 78, thus completely encloses the top opening in the valve body 10 and is sealed to the valve body 10 in order to ensure that there is no leakage of the fluid from the valve. While the casing and the valve body are hermetically sealed together, the sealing weld 90, and likewise the sealing weld 34 described in connection with the bottom plug 20, can be easily cut open in order to allow disassembly and repair of the internal parts of the valve. In addition, the casing illustratively described herein, allows the mounting of the solenoid coil at a preselectable distance from the valve body 10 to facilitate cooling of the solenoid coil even when the system is operated at relatively high temperatures.

The armature 60 of the solenoid which is preferably formed of a corrosion-resistant magnetic material, such as magnetic stainless steel, is furnished with an electrical dampening ring 110 formed of an electrically conducting, corrosion-resistant material, such as aluminum. The dampening ring 110 is provided in order to reduce the noise level of the solenoid 112 in the event that the latter, as in this example, is operated from a rectified alternating electrical potential. The armature 60 is arranged in a manner that ample clearance between the periphery thereof and the inner wall of the upper casing section 78 is maintained in order to minimize motion-damping of the armature 60 as it moves through the fluid present in the interior of the valve. The solenoid coil 112, which is enclosed within an electrically insulating casing 114, is mounted on the outer surface of the upper section 78 of the composite casing. The coil 112 is furnished with suitable laminated magnetic end plates 116 and 118 held together by rivets 120. The end plates 116 and 118 serve to concentrate the magnetic flux of the solenoid acting upon the armature 60. The solenoid coil 112 with the associated end plates 116 and 118 is held in position against a shoulder 122 and the flange 82 of the lower tubular section 80 of the casing by means of a cup-shaped retaining clamp 124 threaded onto a stud 126. The stud 126 is threaded into the upper end of the tubular section 78 and is positioned thereon by a collar 128. The stud 126, in this example, is hermetically sealed to the tubular section 78 by annular weld 130. A cotter pin 132 inserted through suitable apertures in hub 134 of the clamp 124 and through a corresponding aperture in the stud 126, prevents loosening of the clamp 124 during operation of the valve. The solenoid assembly, including the coil 112, end plates 116 and 118, and the clamp 124 are enclosed within a suitable cover 136, the lower end of which is inserted into an annular indent 138 formed in the flange 82 of the lower casing section 80. The cover 136 is held in position against a sealing gasket 140 by means of a nut 142 also threaded onto the stud 126 and is provided with a suitable aperture 144 through which electrical conductors 146 extend for making circuit connection to the solenoid coil 112.

The solenoid cover 136 is provided with a number of radially extending cooling fins 146 for dissipating heat developed in the solenoid coil 112. Similarly, radially extending cooling fins 148 are provided about the outer surface of the lower section 80 of the casing to ensure proper cooling of the valve mechanism and of the fluid moving into the normally static chamber 57 upon actuation of the valve mechanism 44 to its downward position.

The valve, as shown in the drawing, is in the at-rest position with the outlet opening 12 closed and the inlet opening 14 open to the exhaust opening or second outlet opening 16. In this position the solenoid is deenergized and the spring 58 is urging the valve seat 46 against the inlet seat 40. Obviously, the valve mechanism will be impelled to the position just described, in the event that the electric circuit to the solenoid coil 112 is accidentally interrupted. Thus, the valve may be so connected in the system, in which the valve is to be utilized, that the aforedescribed position of the valve is preselected against the advent of power failure. Obviously too, the valve piston 48 may be normally urged in the opposite, or downward, direction, if desired to normally close the exhaust outlet 16, by placing the spring 58 in a position (not shown) between the armature stem flange 68 and the armature stem guide bushing 100. It follows then that the position of the armature must be rearranged, in a well-known manner, to cause the solenoid armature to be attracted upwardly instead of downwardly to properly overcome the bias of the spring 58 in its latter-described position.

When the solenoid is energized, in the arrangement illustrated in the drawing, the magnetic flux of the solenoid will pull the armature 60 downward. As the armature 60 moves downward it will overcome the force of the spring 58 and attain a substantial momentum before it contacts the valve stem or piston 48 of the valve mechanism 44 thus delivering an impact to the top surface of the head 62 to ensure separation of the valve seats 40 and 46 and movement of the valve mechanism 44. After contacting the head 62 of the valve stem 46, the armature 60 will move the valve mechanism 44 until the seat 47 contacts the exhaust seat 42 to connect the valve inlet opening 12 with the valve outlet opening 14 and with the associated parts of the system wherein the valve is utilized.

Upon deenergizing the solenoid coil 112 the valve mechanism is returned under impetus of the compression spring 58 to its at-rest position whereat seat 46 engages inlet seat 40 to close outlet opening 12. Inasmuch as the compression force of the spring is directed against the lower surface of the flange 68, the components of the lost-motion connection operate in the reverse order to deliver an impact blow to the lower surface of the head 62. The movement of the valve mechanism 44 in either direction is damped due to the fact that fluid must flow into or out of the space above the end of the valve stem 48, via the passage 56. The rate of flow of this fluid and thus the degree of damping can be controlled by varying the size of the passage 56 in the valve stem 46. It is readily apparent that the degree of damping will have no appreciable influence upon the ability of the lost-motion connection to effect separation of components of the valve in the event that they have become bound, as from prolonged use of the valve in one position thereat. This consideration follows from the fact that the valve mechanism 44 does not move any appreciable distance before the aforesaid components become loosened. The passage 56 additionally serves to balance the static fluid forces exerted upon the valve mechanism and other components of the valve when they are in a static position.

The use of a separate composite casing to enclose the solenoid armature and upper portions of the valve mechanism 44 permits easy assembly and disassembly of the valve while providing a hermetically sealed unit. Additionally, the composite casing allows mounting of the solenoid a distance from the lower valve body and thus facilitates cooling of the solenoid and the upper portions of the valve mechanism 44 via the cooling fins 146 and 148.

The foregoing detailed description of an exemplary form of the present invention has been presented for illustrational purposes only, and it is contemplated, therefore, that many modifications and changes will occur to those skilled in the art without departing from the scope of the appended claims. Moreover, it is to be understood that certain features of the invention can be utilized without a corresponding use of other features.

I claim as my invention:

1. A solenoid-operated valve comprising a valve body having internally connected inlet, first outlet, and second outlet openings and having a bore therein communicating with said openings and with a static fluid chamber spatially removed from said openings; individual valve seats formed in said body adjacent each of said outlet openings; a valve mechanism including an elongated piston closely conforming to said bore and mounted for reciprocation therein, and a valve seat-engaging member connected to one end of said piston for engaging alternately said valve seats, said mechanism having a static pressure-equalizing and motion-damping passage extending longitudinally through said piston and said member and communicating with said chamber and with at least one of said openings; a casing secured to said valve body and communicating with the bore thereof, said casing enclosing said mechanism; a solenoid coil mounted on the exterior of said casing; a solenoid armature movably mounted within said casing and adjacent said coil, said armature being coupled to the other end of said piston through a lost-motion connection; and electrical circuitry for connecting said solenoid coil to a source of electric potential.

2. In combination, a solenoid-operated valve having a valve mechanism coupled through a lost-motion connection to a solenoid armature, said valve including a valve body having internally connected inlet and first and second outlet openings and having a bore therein communicating with said openings and with a static fluid chamber spatially removed from said openings, a valve seat formed in said body adjacent each of said outlet openings, said valve mechanism including an elongated piston conforming to said bore and mounted for reciprocation therein, a valve seat-engaging member connected to said piston at one end thereof for engaging alternately said valve seats, said mechanism having a static pressure-equalizing and motion-damping passage extending longitudinally through said piston and said member, said passage communicating with said chamber and with at least one of said openings to equalize the pressure on said valve mechanism when the latter is in engagement with one of said valve seats, said valve seat engaging member and said one end of said piston being shaped to provide static pressure equalization on said valve mechanism when the latter is in engagement with the other of said valve seats; and sealing means secured within said bore and engaging said piston and said bore, said sealing means extending substantially along the entire length of said piston.

3. A valve comprising a valve body having internally connected inlet, first outlet, and second outlet openings and having a bore therein communicating with said openings; a pair of valve seats formed in said body adjacent said outlet openings, respectively; a valve mechanism including a piston mounted for reciprocation within said bore and a valve seat-engaging member connected to said piston for engaging alternately said valve seats; means for moving said mechanism in one direction through said bore, said moving means being coupled to said valve mechanism through a lost-motion connection and being arranged to urge said mechanism to a position of engagement with said first outlet valve seat; biasing means mounted adjacent said bore in engagement with said lost-motion connection and urging said valve mechanism through said lost-motion connection to a position of engagement with said second outlet valve seat; and said mechanism having a static pressure-equalizing and motion-damping passage extending longitudinally through said piston and said member, said passage communicating with said bore and being constricted to reduce the flow of fluid therethrough in order to damp the motion applied to said mechanism by said moving means and by said biasing means.

4. A valve comprising a valve body having internally connected inlet, first outlet and second outlet openings and having a bore therein communicating with said openings; individual valve seats formed in said body adjacent each of said outlet openings; a valve mechanism including a piston conforming to said bore and mounted for reciprocation therein and a valve seat-engaging member connected to one end of said piston for engaging alternately said valve seats, means for moving said valve mechanism to positions of engagement with said valve seats, respectively, said mechanism having a static pressure-equalizing and motion-damping passage extending longitudinally through said piston and member so that the opposite ends of said mechanism are subjected to the same pressure, said member having a necked-down portion formed thereon adjacent said valve seats, said one end of said piston and said seats being substantially equal in diameter so that pressure transmitted to said mechanism from one of said openings is equalized by substantially equal confronting surfaces of said necked-down portion when said mechanism is in engagement with one of said valve seats, and the other end of said piston being substantially equal in diameter to said valve seats to equalize the pressure on said valve mechanism when the latter is in engagement with the other of said valve seats.

5. A valve comprising a valve body having internally connected inlet, first outlet, and second outlet openings and having a bore therein communicating with said openings; a pair of valve seats formed in said body adjacent said outlet openings, respectively; a valve mechanism including an elongated piston conforming to said bore and mounted for reciprocation therein and a valve seat-engaging member connected to one end of said piston for engaging alternately said valve seats, means for moving said mechanism to positions of engagement with said valve seats, respectively, said last-mentioned means being coupled to the other end of said piston through a lost-motion connection, said mechanism having a static pressure-equalizing and motion-damping passage extending longitudinally through said piston and said member to equalize the pressure on said valve mechanism when the latter is in engagement with one of said seats, said one end of said piston and said valve seat-engaging member being shaped to provide static pressure equalization on said valve member when the latter is in engagement with the other of said seats, and said passage communicating with said bore through an opening formed in said lost-motion connection.

6. In combination, a solenoid-operated valve having a valve mechanism coupled through a lost-motion connection to a solenoid armature; said valve including a valve body having internally connected inlet and outlet openings and having a bore therein communicating with said openings and with a static fluid chamber spatially removed from said openings; a valve seat formed in said body adjacent said opening; said valve mechanism including a piston conforming to said bore and mounted for reciprocation therein, a valve seat-engaging member connected to said piston for engaging said valve seat, said mechanism having a static pressure-equalizing and motion-damping passage extending longitudinally through said piston and member and communicating with said chamber and with at least one of said openings; sealing means secured within said bore and engaging said piston and said bore, said armature having a portion thereof located in said valve body but spaced from said chamber with said last mentioned portion cooperating with the coil of the solenoid for actuation of said valve, said valve body having a portion located between said armature portion and said chamber to localize the magnetic effects induced by said solenoid, and said valve body portion having an opening therethrough communicating beween said chamber and said armature portion to equalize the pressure on said armature portion.

7. In combination, a solenoid-operated valve having a valve mechanism coupled to a solenoid armature; said valve including a valve body having internally connected inlet and outlet openings and having a bore therein communicating with said openings and with a static fluid chamber spatially removed from said openings; a valve seat formed in said body adjacent said openings; said valve mechanism including a piston conforming to said bore and mounted for reciprocation therein and a valve seat-engaging member connected to said piston for engaging said valve seat, said mechanism having a static pressure-equalizing and motion-damping passage extending longitudinally through said piston and member and communicating with said chamber and with at least one of said openings; sealing means secured within said bore and engaging said piston and said bore, said armature having a portion thereof located in said valve body but spaced from said chamber with said last mentioned portion cooperating with the coil of the solenoid for actuation of said valve, said valve body having a portion located between said armature portion and said chamber to localize the magnetic effects induced by said solenoid, and said valve body portion having an opening therethrough communicating between said chamber and said armature portion to equalize the pressure on said armature portion.

References Cited in the file of this patent

UNITED STATES PATENTS

| | | |
|---|---|---|
| 258,500 | Storer | May 23, 1882 |
| 1,204,952 | Davidson | Nov. 14, 1916 |
| 1,644,714 | Eisenhauer | Oct. 11, 1927 |
| 1,693,257 | Shield | Nov. 27, 1928 |
| 1,696,738 | Stedwell | Dec. 25, 1928 |
| 2,114,961 | Gille | Apr. 19, 1938 |
| 2,145,977 | Foster | Feb. 7, 1939 |
| 2,226,851 | Franck | Dec. 31, 1940 |
| 2,232,538 | Kriese | Feb. 18, 1941 |
| 2,243,863 | Hoy | June 3, 1941 |
| 2,410,960 | Bunn | Nov. 12, 1946 |
| 2,717,003 | Jay | Sept. 6, 1955 |
| 2,735,644 | Bishofberger | Feb. 21, 1956 |
| 2,797,061 | Buchanan | June 25, 1957 |
| 2,805,680 | Longbottom | Sept. 10, 1957 |
| 2,897,836 | Peters | Aug. 4, 1959 |

FOREIGN PATENTS

| | | |
|---|---|---|
| 15,994 | Australia | Jan. 31, 1935 |
| 1,052,702 | France | Sept. 23, 1953 |